United States Patent [19]

Gomberg

[11] E Re. 29,890

[45] Reissued Jan. 30, 1979

[54] FLAT FREE PNEUMATIC TIRE AND VOID FREE FILLING THEREFOR

[75] Inventor: Edward N. Gomberg, Tustin, Calif.

[73] Assignee: Synair Corporation, Tustin, Calif.

[21] Appl. No.: 851,621

[22] Filed: Nov. 14, 1977

Related U.S. Patent Documents

Reissue of:

[64] Patent No.: 3,866,651
Issued: Feb. 18, 1975
Appl. No.: 404,856
Filed: Oct. 10, 1973

U.S. Applications:

[63] Continuation-in-part of Ser. No. 397,940, Sep. 17, 1973, abandoned.

[51] Int. Cl.[2] ..... B60C 1/00

[52] U.S. Cl. ..... 152/313

[58] Field of Search ..... 152/313, 311, 312; 260/2.5 A

[56] References Cited

U.S. PATENT DOCUMENTS 3,605,848 9/1971 Lombardi et al. ..... 152/313

*Primary Examiner*—Stanley H. Tollberg
*Attorney, Agent, or Firm*—Lyon & Lyon

[57] ABSTRACT

A flat free pneumatic tire comprising a casing and a void free elastomeric filling material, which filling material is a polyurethane of (a) prepolymer of organic polyisocyanate and defined polyether or defined polyester and (b) a defined polyether or defined polyester, in the absence of foam producing material in the reaction zone. The elastomeric filling material itself. A two container article (system) adapted for producing said void free filling material where one container has said prepolymer reactant and the other container has the polyether or polyester reactant, as required.

8 Claims, 1 Drawing Figure

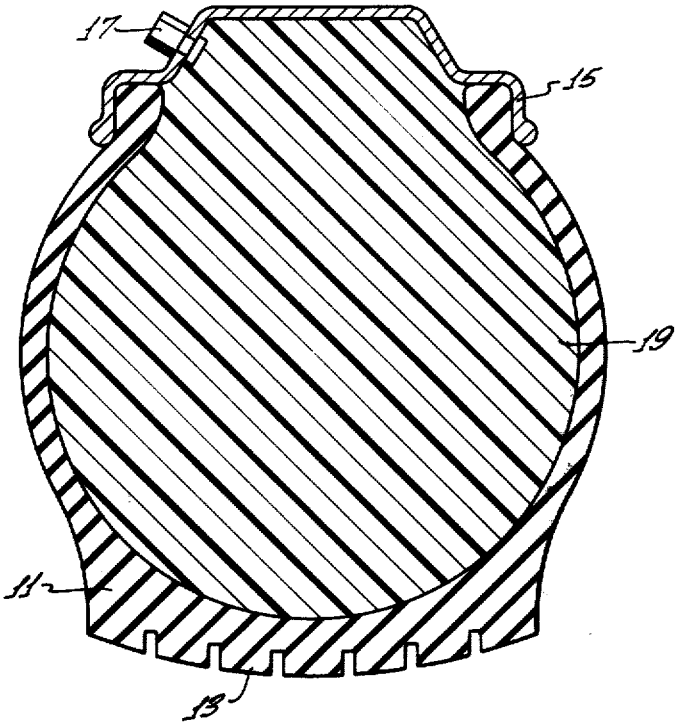
17
15
19
11
13

FLAT FREE PNEUMATIC TIRE AND VOID FREE FILLING THEREFOR

Matter enclosed in heavy brackets [ ] appears in the original patent but forms no part of this reissue specification; matter printed in italics indicates the additions made by reissue.

CROSS REFERENCE TO RELATED APPLICATION

This is a continuation-in-part application of my copending application Ser. No. 397,940, filed Sept. 17, 1973, *(now abandoned)* and entitled Hybrid Solid Filled Pneumatic Tire.

BACKGROUND OF THE INVENTION

1. Field of the Invention

This invention relates to the flat free pneumatic tires having a filling of void free polyurethane elastomer; to such void free polyurethane elastomer per se; to a method of introducing such filling into pneumatic tire casing; and to the reactants for producing such void free polyurethane elastomer.

2. Description of Prior Art

Modern industry demands maximum equipment operating efficiency with a minimum "downtime" of its pneumatic tired machines. In many areas of severe service "downtime" due to the flat tires is a real problem and the many dollars added to the cost of operation cannot be tolerated. Some of these severe operational areas are: aircraft support equipment; dock vehicles; farm equipment; industrial vehicles such as fork lifts and tractors; lumbering operations; mining machinery and vehicles; military vehicles; municipal service equipment; and scrap metal yards. In such severe service areas flat free tires offer a genuine advantage over conventional pneumatic tires or are a necessity.

Automotive vehicles, motor cars and trucks, can use flat free tires on unpaved road or off road service. Vehicles which do not carry spares, such as motorcycles, motor bikes, and bicycles, find flat free tires invaluable.

So-called deflation proof tires have been available for some years; these tires all depend on a foamed elastomer filling. The foamed filling has serious disadvantages, especially excessive heat buildup within the tire during service; filler breakdown during service decreases or eliminates casing support causing severe casing damage. A major disadvantage is the filling must be "factory installed" and this is expensive.

Four patents directed to foamed elastomeric filled tires are cited as of interest in showing the problems of conventional pneumatic tires in severe service and also of foamed fillings: U.S. Pat. No. 3,022,810; 3,112,785; 3,381,735; and 3,605,848.

OBJECTS OF THE INVENTION

One object of this invention is an essentially void free polyurethane elastomeric filling material for use in pneumatic tires which is an improvement on presently available foamed filling material.

Another object of this invention is a simple article affording the two essential reactants needed for the void free elastomer of this invention.

Still another object of this invention is a pneumatic tire casing and wheel assembly including a void free polyurethane elastomeric filling material which makes the tire flat free.

Yet another object of this invention is a simple method for introducing the filling material of this invention into a tire casing.

Other objects of this invention will become apparent during the detailed description of this invention.

BRIEF DESCRIPTION OF THE DRAWING

The single FIGURE shows a cross section through a pneumatic tire mounted on a wheel rim provided with a now-closed opening through which the liquid filling material was introduced to fill the tire casing with void free resilient elastomeric material.

BRIEF SUMMARY OF THE INVENTION

A. A flat free pneumatic tire comprising a pnuematic tire casing and an essentially void free elastomeric filling material confined at least in part by said casing, said elastomeric filling material being the product of the reaction of: (a) a prepolymer of organic polyisocyanate and (i) hydroxyl group terminated, polyfunctional polyether, or (ii) hydroxyl group terminated, polyfunctional polyester, wherein essentially all prepolymer terminal groups are isocyanate groups, or (b) the prepolymer of (a)(i) or (a)(ii) where the terminal isocyanate groups are blocked to afford "isocyanate" reactivity at elevated temperature only; and (c)(i) hydroxy group terminated polyfunctional polyether in the case of (a)(i) and (b)(i), or (ii) hydroxyl group terminated polyfunctional polyester in the case of (a)(ii) and (b)(ii), in the essential absence of foam producing material in the reaction zone, to obtain a poly(ether)urethane of poly(ester)urethane elastomer which elastomer is essentially free of voids. Preferably the filling material is wholly confined by said casing and the rim of the vehicle wheel on which said tire is mounted.

B. An especially preferred embodiment is a flat free pneumatic tire comprising a pneumatic tire casing and an essentially void free elastomeric filling material confined by said casing and the rim of the vehicle wheel on which said tire is mounted, said elastomeric material being the product of the reaction of: (a) a prepolymer of about 16 parts (all parts herein are by weight) of toluene diisocyanate 80/20 isomer content, and about 84 parts of triol polyoxypropylene derivative of glycerine of about 3,000 molecular weight, and about 0.03 parts of stannous octoate catalyst, at ambient temperature, said prepolymer having a theoretical free isocyanate group content of about 4.2% and an equivalent weight of about 1,000; and (b) a mixture of polyoxypropylene diol of molecular weight about 2,000 and the triol of (a), said mixture having an equivalent weight of about 1,000; (c) said prepolymer of (a) and said mixture of (b) being reacted in about equal parts by weight in the presence of about 0.02 parts of stannous octoate catalyst; (d) the liquid reaction of product of (c) was cured at about 160° F. for about 12 hours to obtain a resilient essentially void free elastomeric product.

C. A resilient essentially void free elastomeric product adapted for use as a filling material for a pneumatic tire, which elastomeric product is defined in paragraph "A" of this section.

D. A resilient essentially void free elastomeric product adapted for use as a filling material for a pneumatic tire, which elastomeric product is defined in paragraph "B" of this section.

E. A method of producing a flat free pneumatic tire for use on a vehicle wheel which method comprises (1) affording a gas escape outlet in a tire casing mounted on a wheel rim and setting said escape outlet at the uppermost point of said tire during the entry of liquid filling material inside of said casing: (2) affording a vessel wherein reactant materials, essentially free of foam producing material, to produce said liquid filling material are intimately intermingled, without the use of foam producing material, (3) said reactant materials are as defined in paragraph "A" or paragraph "B" of this section; (4) introducing said intermingled reactants into said casing prior to gelation of said reactants in said vessel; (5) said introduction being at a point of said casing whereby gas within said casing is forced upward and out through said escape outlet, at a rate such that no substantial amount of said gas is entrained into the liquid reactants mixture; (6) curing said reactants mixture within said casing to obtain a tire casing at least in part filled with a polyurethane elastomer, which elastomer is essentiallly free of voids.

F. A two container article consisting essentially of (I) a first container of prepolymer as defined in paragraph "A" of this section; and (II) a second container of polyether or polyester reactant, as appropriate, as defined in paragraph "A" of this section, said defined reactants being capable on intermingling, in the absence of foam producing material, to produce a resilient, essentially void free elastomeric product adapted for use as a filling material for flat free pneumatic tires. Desirably the first container has prepolymer produced from (a) aromatic diisocyanate and (b) polyoxypropylene diol or triol polyoxypropylene derivative of alkanetriol having 3–6 carbon atoms in said alkanetriol; and the second container has polyether-polyurethane reactant polyoxypropylene diol or triol polyoxypropylene derivative of alkanetriol having 3–6 carbon atoms in said alkanetriol. Preferably the second container includes at least a substantial amount of the immediately hereinbefore defined derivative triol. An especially preferred reactant combination has in the first container a prepolymer reactant produced from (a) toluene diisocyanate and (b) triol polyoxypropylene derivative of glycerine of molecular weight about 3,000: and the second container has a mixture of polyoxypropylene diol of molecular weight about 2,000 and immediately aforesaid triol (b), said mixture having an equivalent weight of about 1,000.

DETAILED DESCRIPTION AND EXAMPLES

Pneumatic Tires

It is to be understood that the invention is useful with any pneumatic tire, from bike size to giant size construction vehicle, whether the tire is of the "tubeless" variety or uses an inner tube.

In the FIGURE a conventional tire casing 11 having a road engaging tread 13 is mounted on a rim 15 of a vehicle wheel (not shown). Rim 15 in this embodiment is provided with a threaded opening (not numbered) wherein a threaded plug 17 is inserted. In accordance with the invention, the space confined by the rim 15 and the inside of the casing 11 is filled with the hereinafter defined essentially void free elastomeric material 19. The FIGURE shows the preferred embodiment of the invention.

In the matter of a solid filling, the filling material may be loaded with inert material such as silica to add weight or may be loaded with lighter weight inert resins to decrease the weight of the filling.

The Filling Material

Briefly, the tire filling material is a resilient, essentially void free elastomeric polyurethane, either a poly(ether)urethane or a poly(ester)urethane. The defined elastomer is the product of the reaction of polyisocyanate prepolymer and defined polyether or defined polyester, dependent on the nature of the prepolymer.

The techniques of polyisocyanate prepolymer formation with these polyethers or polyesters are well known and therefore are not described herein. Also the techniques for reacting prepolymer and these polyesters or polyethers to form an elastomer are well known, with or without catalyst. The time-temperature relationship of curing of the liquid reaction mixture is also well known and can be readily derived for any particular set of reactants.

Source books which can lead to the detailed art material needed are: "Polyurethanes, Chemistry and Technology," Interscience 1962 and "Encyclopedia of Polymer Science and Technology" Interscience 1969.

The Polyisocyanate Reactant

The polyurethane elastomer of this invention may utilize the organic polyisocyanates known to and used in this art. The aromatic diisocyanates are preferred. Exemplary polyisocyanates are: hexamethylene diisocyanate; 3,3'-dimethoxybenzidine-4,4'-diisocyanate; m-xylylene diisocyanate; tolidine diisocyanate; 4,4'-diphenylmethane diisocyanate (MDI); m-phenylene diisocyanate; p-phenylene diisocyanate (PDI); methylene-p-phenylene diisocyanate; 3,3'-dimethyl-4,4'-diphenyl diisocyanate (TODI); methylenebis(2-methyl-p-phenylene) diisocyante; 3,3'-dimethoxy-4,4'-biphenylene diisocyanate; 2,2', 5,5'-tetramethyl-4,4'-biphenylene diisocyanate; 3,3'-dimethyl-4,4'-diphenylmethane diisocyanate (DMDI); 4,4'-diphenylisopropylidene diisocyanate (DPDI); 1,5-naphthylene diisocyanate (NDI).

Especially preferred are the toluene diisocyanate isomers, particularly the 2,4-toluene diisocyanate. The commercially available blends of the 2,4- and 2,6-isomers are effective—the 80:20 and 65:35 blends are most readily available.

The Polyether Reactants

The polyether reactants used in the invention are hydroxyl group terminated polyfunctional polyethers of the type commonly used in poly(ether)urethane formation.

Preferred are the polyoxyalkylene polyols having 2–4 hydroxyl groups and where alkylene has 2–6 carbon atoms. These may be obtained by condensation of the glycols having 2–6 carbon atoms, such as ethylene glycol and 1,6-hexanediol. Or the condensation may involve an alkylene oxide, such as ethylene oxide, propylene oxide, or butylene oxide, with a glycol. Higher polyethers may be obtained by reaction with triol or higher polyol, such as glycerine, trimethylolpropane, and pentaerythritol.

Polyols of the above types are available commercially, for example: Voranols (trademark) from Dow Chemical Company; Poly-G (trademark) from Olin Chemicals Division; and Pluracols (trademark) from BASF Wyandotte Corporation.

The Polyester Reactants

The polyester reactants used in this invention are hydroxyl group terminal polyfunctional materials. The polyester desirably is a polymer of (1) alkanedioic acid having 2–8 carbon atoms and phenylenedioic acid with (2) alkanepolyol and oxyalkylenepolyol where said polyol has 2–3 hydroxyl groups and where alkane and alkylene have 2–6 carbon atoms.

Illustrative are ethanedioic acid, propanedioic acid, butanedioic acid, hexanedioic, e.g., adipic acid; and octanedioic acid; ethylene glycol, propylene glycol, trimethylol propane, trimethylol ethane, hexanetriol, diethylene glycol and dipropylene glycol.

Prepolymer Preparation

The particular polyisocyanate and the particular polyether(s) or polyester(s), as the case may be, are intermingled in proportions to give the desired product wherein essentially all the prepolymer terminal groups are isocyanate groups. Conditions used, i.e., catalyst, no catalyst, time-temperature, are conventional and need not be discussed here.

It is to be understood that "prepolymer" as used herein includes the material where the prepolymer terminal isocyanate groups are blocked with a monofunctional hydroxy or hydrogen compound to afford "isocyanate" reactivity at elevated temperature only, where the isocyanate groups are reactivated. For example, toluene diisocyanate and trimethylol propane when blocked with phenol will react as an isocyanate prepolymer when heated to about 301° F. These blocked prepolymers can be reacted (cross linked) with hydroxy terminated polyesters or polyethers or mixtures of hydroxy terminated polyesters and polyfunctional amines or mixtures of hydroxy terminated polyfunctional polyether and polyfunctional amines. (((i.e.) MOCA, MDA) methylene orthochlorodianaline, methylene dianaline)

The Elastomer Reaction

1. The polyol-prepolymer is reacted with the defined polyol in the essential absence of foam producing material in the reaction, to obtain a poly(ether)urethane elastomer which is essentially free of voids. Voids is used here to describe the cellular formation caused by foam producing material, such carbon dioxide by-product of isocyanate-water reaction. Freon, or air mixed with the liquid reactants.

Preferred reactants are aromatic diisocyanate and polyoxypropylene diol or triol polyoxypropylene derivative of alkanetriol having 3–6 carbon atoms in said alkanetriol. Desirably at least a substantial amount of defined derivative triol is used as a reaction material in the poly(ether)urethane reaction, i.e., between the prepolymer and the polyol.

2. The polyester-prepolymer is reacted with the defined polyester, in the essential absence of foam producing material in the reaction zone to obtain a poly(ester) urethane elastomer which is essentially free of voids.

3. The blocked prepolymer is reacted with the appropriate polyether or polyester at the necessary elevated temperature to afford "isocyanate" reactivity, in the essential absence of foam producing material in the reaction zone to obtain a poly(ether)urethane elastomer or a poly(ester)urethane which is essentially free of voids.

Method of Producing a Flat Tree Pneumatic Tire

The simplicity of the procedure for producing a flat free pneumatic tire by this invention is illustrated by the following embodiment.

i. If the tire has an inner tube, remove this. Drill a suitable hole in the wheel rim for the introduction of liquid filling material. In most instances, a threaded hole to take a one-half inch double end male petcock will be sufficient. However, on large tires, three-quarter inch fillings will speed up the filling.

ii. Clean the inside of the tire casing with compressed air and avoid the presence of water in the inside of the casing. Cuts, gaps, splitrim must be filled with a suitable patching compound. Contact cement can be used on the tire bead and wheel rim to set the tire and to seal small leaks.

iii. Rig the tire and wheel assembly in a vertical position with the filling valve (petcock) at the bottom.

iv. Drill a small hole, such as one-eighth inch, through the top of the tire opposite the filling valve (at the uppermost point of the tire) to provide a gas (air) escape outlet while the liquid filling material is being unjected into the inside of the casing.

v. The filling material reactants come in two containers. One has the isocyanate prepolymer; the other has the polyol or polyester as appropriate for the particular prepolymer. A vessel, such as a pressure pot, preferably with a mechanical stirrer is used. (Air or gas must not be used to mix the two materials.) Also the vessel and the delivery lines to the tire casing must be free of water or other materials which can act as foam producing agents in the elastomer product. A delivery line, preferably a plastic hose, is rigged from the bottom of the vessel to the inlet valve.

The materials are added to the mixing vessel in the necessary proportions and are thoroughly intermingled. It has been found that excellent results are obtained by adjusting the isocyanate and hydroxyl group balance so that equal parts, either by weight or by volume, of the two reactants are used. In a particular embodiment, one of the reactants is dyed yellow and the other reactant is dyed blue, complete blending of the two in the vessel is shown by a uniform green color of the liquid therein.

The reaction time of the materials is managed to permit latitude in mixing and in holding time before gelation interferes with transfer of the material from the vessel. Pot life of 2–8 hours at ambient temperature is readily obtained and permits relaxed carrying of the method without the problems that go with "pressure of time."

vi. Desirably the mixed liquid filling material is transferred from the vessel by means of dry air or nitrogen pressure. When the liquid starts to come out of the escape outlet, the filling valve is shut off; the escape outlet is sealed with a sheet metal screw. Then the filling valve is reopened and the pressure in the tire is allowed to reach the vessel pressure. (In the case of a drive wheel, it is recommended that the tire pressure reach that specified by the manufacturer for the tire in service.) Close the filling valve again and disconnect the delivery hose to the filling valve.

vii. Lay the tire and wheel assembly down in a horizontal position and cure in the horizontal position. Suggested curing time-temperatures are: 7 days at 72° F., 12 hours at 120° F.; and 160° for 8 hours. Variations of these may be used.

viii. After the cure, remove the filling valve and replace with a threaded pipe plug. Remove the sheet metal screw. The filling material will continue to cure in service over a period of as much as 30 days.

ix. The polyurethane elastomers are insoluble once cured. It is important to clean all equipment without delay. Suitable solvents are xylene, toluene, methylene chloride, acetone and methyl ethyl ketone.

Preferred are aromatic diisocyanate, polyoxypropylene diol, and triol polyoxypropylene derivative of alkanetriol having 3–6 carbon atoms in said triol. Also it is preferred that a substantial amount of this defined derivative triol is used as a reaction material in the poly(ether)urethane reaction.

In a particular embodiment, the prepolymer is prepared from toluene diisocyanate and triol polyoxypropylene derivative of glycerine of molecular weight about 3,000 and this prepolymer is reacted with a mixture of polyoxypropylene diol of molecular weight about 2,000 and the aforesaid derivative triol, said mixture having an equivalent weight of about 1,000.

In the case of the blocked prepolymer, this may be premixed and stored as a premix as no reaction will occur until the mix has been heated to the proper temperature. In such instances, no intermingling is necessary and the mix may be injected directly into the tire casing.

Article (System) Affording the Defined Reactants

Dealers in filling flat free pneumatic tires in accordance with this invention need only obtain a two container article (system) to practice the invention. One container contains isocyanate prepolymer as defined hereinbefore and the other container contains either polyol or polyester as appropriate for the prepolymer. The two containers form a combination which permits one unskilled in the art to practice the production of the tire filling material invention. For broad and preferred embodiments of the article, see "F" in the "Summary of the Invention" Section herein.

It is to be understood the blocked prepolymer may be mixed with the particular polether or polyester, as the case may be, and shipped and/or stored at ordinary temperatures in a single container and used as a one-component system for the production of the essentially void free elastomer product of this invention.

EXAMPLES

The following examples I–V are embodiments of elastomers of the invention. In each example the diisocyanate was the 80:20 toluene diisocyanate (TDI).

In each example stannous octoate was used as the catalyst in both prepolymer and polyurethane reactions.

The diol reactants were polyoxypropylene diols of average molecular 4,000 in Example I and MW 2,000 in Example II.

The triol was a polyoxypropylene derivative of glycerine of average molecular weight 5,000, equivalent weight 1,500, of Example I, MW 3,000, equivalent weight 1,000, of Example II, and MW 4,500, equivalent weight 1,500, of Example III.

In Examples IV and V, the polyester was poly(ethylene adipate)glycol of equivalent weight of 625.

In all examples the prepolymer was formed by reacting the hereinafter set forth amounts of TDI and polyol or polyester at ambient temperature. The equivalent weight of the prepolymer was obtained and the theoretical free isocyanate calculated.

The previously prepared prepolymer was reacted with the polyol or polyester at ambient temperature and the product cured: 12 hours at 160° F. for the poly(ether)urethane and 10 hours at 200° F. for the poly(ester) urethane.

Durometer hardness. A Scale; tensile strength, psi; elongation to break; and compression set were run on all products.

All proportions in the examples are by weight.

| Prepolymer | | Example I | | Example II | | Example III |
|---|---|---|---|---|---|---|
| | diol | 90.34 | triol | 83.91 | triol | 88.65 |
| TDI | | 9.63 | | 16.06 | | 11.22 |
| Catalyst | | 0.03 | | 0.03 | | 0.03 |
| Theor. Free NCO | | 2.74% | | 4.23% | | 2.98% |
| Equivalent Wt | | 1527 | | 993 | | 1409 |
| Polyurethane Reaction | | | | | | |
| Prepolymer | | 50.00 | | 49.94 | | 46.90 |
| | triol | 49.97 | triol | | | |
| | | | diol | 49.94 | triol | 53.07 |
| Catalyst | | 0.03 | | 0.03 | | 0.03 |
| Durometer, A Scale | | 8 | | 20 | | 30 |
| Tensile, psi | | 186 | | 136 | | 190 |
| Elongation to Break | | 1100% | | 250% | | 320% |
| Compression set | | 7% | | 0% | | 0% |
| | | Example IV | | | | |
| Prepolymer | | | | | | |
| Polyester | | | | 75.73 | | |
| TDI | | | | 24.24 | | |
| Catalyst | | | | 0.03 | | |
| Theor. Free NCO | | | | 6.8% | | |
| Equivalent Wt | | | | 615 | | |
| Polyurethane Reaction | | | | | | |
| Polyester | | | | 49.97 | | |
| Prepolymer | | | | 50.00 | | |
| Catalyst | | | | 0.03 | | |
| Durometer Hardness, A Scale | | | | 43 | | |
| Tensile, psi | | | | 1550 | | |
| Elongation to Break | | | | 510% | | |
| Compression Set | | | | 0.65% | | |

EXAMPLE V

An isocyanate terminated prepolymer containing 6.95% free NCO is prepared by reacting a poly(ethylene adipate)glycol, having an approximate equivalent weight of 650, with toluene diisocyanate. A poly(ethylene adipate)glycol having an equivalent weight of 625 is sold by Indpol Corporation of Cucamonga, Calif., under the trade name "Estrol 600."

Fifty seven (57) parts by weight of the above prepolymer are then mixed thoroughly with (43) parts of Estrol 600 to which 0.03% stannous octoate catalyst had been previously added.

Mixing takes place either by machine or by hand at room temperature for approximately 5 minutes, that is, for a period sufficient to ensure a blending of colors of the two components, where such components are initially colored with different colors to facilitate identification of the occurrence of adequate mixing. The [pot life of the] mixture is then injected into the prepared wheel and tire casing as described above and allowed to cure for 12 hours at 200° F. The liquid mixture will cure with the following characteristics:

| | |
|---|---|
| Tensile strength approximately | 1400 psi |
| Elongation to rupture | 500% |
| Tear strength (Die C) | 68–75 p.l.i. |
| Durometer hardness, A Scale | 30± |

The physical characteristics of the cured material can be changed within a limited range by changing the ratio of Estrol 600 to prepolymer. It is found that 50 parts of Estrol 600 mixed with 50 parts of prepolymer will result in a cured rubber with Durometer hardness of 43 of the A Scale. Hardness decreases as the mixture is changed from this equal part mixture within a range of from 40 parts prepolymer with 60 parts Estrol 600 to 60 parts prepolymer with 40 parts Estrol 600. This range of mixtures will provide a Durometer hardness in the range of 25–43 on the A Scale.

Road Test Examples

A. Two popular sizes (8.25×15 and 10.00×15) of mining vehicle tires were filled using the method of the invention using the reactants of Example II in that proportion to obtain void free filled pneumatic tires. Closed cell foam filled tires are available commercially in these sizes.

Conventional air filled tires, the foam filled tires, and the void free filled tires were tested for deflection. In the rated load range, the void free tires were equal to the air filled tires. In the overload condition, the void free filled tires showed less deflection than the air filled tires. The void free filled tires were better than the foam filled tires in both the rated load and in the overload condition.

Laboratory tests showed a definite advantage on heat buildup characteristics for the void free filled tires over the foam filled tires.

B. (1). Truck tires of rib design, highway type, in road tests showed void free filled tires averaged about 80° F. cooler running than foam filled tires.

(2). Truck tires of the traction type, cross bar lug design showed the void free filled tires gave excellent results at speeds of 60 mph or less. Continuous speeds of 60–70 mph for periods of 5 hours did show beginning of excessive heat buildup.

(3). Truck tires of extra heavy rib design, M&L type, showed foam filled tires failed after only a few miles at 60 mph — caught fire. No void free filled tire failed this test.

C. Some GR70–15 radial tires filled with void free filling were run on heat stabilization tests on an indoor test wheel. One tire showed "high" temperature after being run 6 hours at 80 mph. All the other tires in this test showed satisfactory performance temperature after 6 hours at 80 mph.

It was concluded from the above tests that this void free elastomeric filling material possesses the necessary characteristics for a pneumatic tire filling material.

The foregoing detailed description is to be clearly understood as given by way of illustration and example only, the spirit and scope of this invention being limited solely by the appended claims.

I claim:

1. A flat free pneumatic *tire comprising a pneumatic* tire casing and an essentially void-free polyurethane elastomeric filling material confined, at least in part, by said casing, said elastomeric material being the product of the reaction of, in the essential absence of foam producing material in the reaction zone, a defined prepolymer and a defined other reactant, where said prepolymer reactant is selected from the class consisting of 1. organic polyisocyanate and hydroxyl group terminated polyfunctional polyether, wherein essentially all the prepolymer terminal groups are isocyanate groups;
2. organic polyisocyanate and hydroxyl group terminated polyfunctional polyester, wherein essentially all the prepolymer terminal groups are isocyanate groups;
3. organic polyisocyanate and hydroxyl group terminated polyfunctional polyether wherein essentially all the prepolymer terminal groups are isocyanate groups which groups have been blocked to afford "isocyanate" reactivity only at elevated temperature; and
4. organic polyisocyanate and hydroxyl group terminated polyfunctional polyester wherein essentially all the prepolymer terminal groups are isocyanate groups which groups have been blocked to afford "isocyanate" reactivity only at elevated temperature;

said other reactant is hydroxyl group terminated polyfunctional polyether, in the case of said prepolymer (1) and said prepolymer (3) to obtain poly(ether)urethane elastomeric material;

said other reactant is hydroxyl group terminated polyfunctional polyester, in the case of said prepolymer (2) and said prepolymer (4) to obtain poly(ester)urethane elastomeric material;

said polyurethane elastomeric material being characterized in part by an essential freedom from voids.

2. The tire as defined in claim 1 wherein said filling material is wholly confined by said casing and the rim of the vehicle wheel on which said tire is mounted.

3. The tire of claim 1 wherein said polyisocyanate is aromatic diisocyanate.

4. The tire of claim 1 wherein said polyether is polyoxyalkylene polyol having 2–4 hydroxyl groups and where alkylene has 2–6 carbon atoms.

5. The tire of claim 1 wherein said polyester is a polymer or copolymer of (1) alkanedioic acid having 2–8 carbon atoms and phenylenedioic acid with (2) alkanepolyol and oxyalkylenepolyol where said polyol has 2–3 hydroxyl groups and where alkane and alkylene have 2–6 carbon atoms.

6. The tire of claim 1 wherein said polyisocyanate is aromatic diisocyanate and said polyether is polyoxypropylene diol or triol polyoxypropylene derivative of alkanetriol having 3–6 carbon atoms in said alkanetriol.

7. The tire of claim 6 wherein at least a substantial amount of defined derivative triol is used as a reaction material in the poly(ether)urethane reaction.

8. The tire of claim 1 wherein said prepolymer is prepared from toluene diisocyanate and triol polyoxypropylene derivative of glycerine of molecular weight about 3,000, and said TDI-triol prepolymer is reacted with a mixture of polyoxypropylene diol of molecular weight about 2,000 and aforesaid triol, said mixture having an equivalent weight of about 1,000.

[9. A resilient essentially void-free polyurethane elastomer material product adapted for use as a filling material for a pneumatic tire, said elastomeric material being the product of the reaction of, in the essential absence of foam producing material in the reaction zone, a defined prepolymer reactant and a defined other reactant, where said prepolymer reactant is selected from the class consisting of (1) organic polyisocyanate and hydroxyl group terminated polyfunctional polyether, wherein essentially all the prepolymer terminal groups are isocyanate groups;

(2) organic polyisocyanate and hydroxyl group terminated polyfunctional polyester, wherein essentially all the prepolymer terminal groups are isocyanate groups;

(3) organic polyisocyanate and hydroxyl group terminated polyfunctional polyether wherein essentially all the prepolymer terminal groups are isocyanate groups which groups have been blocked to afford "isocyanate" reactivity only at elevated temperature; and (4) organic polyisocyanate and hydroxyl group terminated polyfunctional polyester wherein essentially all the prepolymer terminal groups are isocyanate groups which groups have been blocked to afford "isocyanate" reactivity only at elevated temperature;

said other reactant is hydroxyl group terminated polyfunctional polyether, in the case of said prepolymer (1) and said prepolymer (3) to obtain poly(ether)urethane elastomeric material;

said other reactant is hydroxyl group terminated polyfunctional polyester, in the case of said prepolymer (2) and said prepolymer (4) to obtain poly(ester)urethane elastomeric material;

said polyurethane elastomeric material being characterized in part by an essential freedom from voids.]

[10. The product of claim 9 wherein said polyisocyanate is aromatic diisocyanate.]

[11. The product of claim 9 wherein said polyether is polyoxyalkylen polyol having 2–4 hydroxyl groups and where alkylene has 2–6 carbon atoms.]

[12. The product of claim 9 wherein said polyester is a polymer or copolymer of (a) alkanedioic acid having 2–8 carbon atoms and phenylenedioic acid with (b) alkanepolyol and oxyalkylenepolyol where said polyol has 2–3 hydroxyl groups and where alkane and alkylene have 2–6 carbon atoms.]

[13. The product of claim 9 wherein said polyisocyanate is aromatic diisocyanate and said polyether is polyoxypropylene diol or a triol polyoxypropylene derivative of alkanetriol having 3–6 carbon atoms in said alkanetriol.]

[14. The product of claim 13 wherein at least a substantial amount of defined derivative triol is used as a reaction material in the poly(ether)urethane reaction.]

[15. The product of claim 9 wherein said prepolymer is prepared from toluene diisocyanate and triol polyoxypropylene derivative of glycerine of molecular weight of about 3,000, and said TDI-triol prepolymer is reacted with a mixture of polyoxypropylene diol of molecular weight about 2,000 and aforesaid triol, said mixture having an equivalent weight of about 1,000.]

[16. A resilient essentially void-free polyurethane elastomeric material product adapted for use as a filling material for pneumatic tires, said elastomeric material being the product of the reaction of a. a prepolymer of about 16 parts of toluene diisocyanate, 80/20 isomer content, and about 84 parts of triol polyoxypropylene derivative of glycerine of about 3,000 molecular weight, and about 0.03 parts of stannous octoate catalyst, at ambient temperature, said prepolymer having a theoretical free isocyanate group content of 4.2% and an equivalent weight of about 1,000;

b. a mixture of polyoxypropylene diol of molecular weight of about 2,000 and the triol of (a), said mixture having an equivalent weight of about 1,000;

c. said prepolymer of (a) and said mixture of (b) being reacted in about equal weight parts, in the presence of about 0.2 parts of stannous octoate catalyst, and d. the liquid reaction product of (c) being cured at about 160° F. for about 12 hours to obtain a resilient, essentially void-free elastomeric product.]

* * * * *